(12) United States Patent
Schnier et al.

(10) Patent No.: US 11,224,156 B2
(45) Date of Patent: Jan. 18, 2022

(54) PRECISION SEEDER

(71) Applicant: BAYER CROPSCIENCE AG, Monheim am Rhein (DE)

(72) Inventors: Heinz-Friedrich Schnier, Leverkusen (DE); Carsten Conzen, Leverkusen (DE); Livia Assumpcao Moreira, Cologne (DE)

(73) Assignee: BAYER CROPSCIENCE AG, Monheim am Rhein (DE)

( * ) Notice: Subject to any disclaimer, the term of this patent is extended or adjusted under 35 U.S.C. 154(b) by 206 days.

(21) Appl. No.: 16/088,277

(22) PCT Filed: Apr. 4, 2017

(86) PCT No.: PCT/EP2017/057952
§ 371 (c)(1),
(2) Date: Sep. 25, 2018

(87) PCT Pub. No.: WO2017/182261
PCT Pub. Date: Oct. 26, 2017

(65) Prior Publication Data
US 2020/0323126 A1    Oct. 15, 2020

(30) Foreign Application Priority Data
Apr. 22, 2016    (EP) .................... 16166525

(51) Int. Cl.
*A01C 1/06* (2006.01)
*A01C 7/04* (2006.01)
*A01C 7/10* (2006.01)

(52) U.S. Cl.
CPC ............. *A01C 1/06* (2013.01); *A01C 7/046* (2013.01); *A01C 7/105* (2013.01)

(58) Field of Classification Search
CPC .... A01C 1/00; A01C 1/06; A01C 1/08; A01C 7/006; A01C 7/04; A01C 7/042;
(Continued)

(56) References Cited

U.S. PATENT DOCUMENTS

| | | | |
|---|---|---|---|
| 4,356,934 A | 11/1982 | Knake | |
| 2007/0207485 A1* | 9/2007 | Deppermann | B26D 1/04 435/6.12 |

(Continued)

FOREIGN PATENT DOCUMENTS

| | | |
|---|---|---|
| CA | 2 644 958 A1 | 9/2007 |
| DE | 3333435 A1 | 5/1984 |

(Continued)

*Primary Examiner* — Thomas B Will
*Assistant Examiner* — Ian A Normile
(74) *Attorney, Agent, or Firm* — Pauley Erickson & Swanson

(57) ABSTRACT

A single-grain seeder for introducing seeds into soil, including a singulating member which is suitable for singulating seeds supplied from a storage container and for dispensing the seeds individually, wherein the single-grain seeder has an application unit for applying a dressing agent to a singulated seed, wherein the application unit is arranged with respect to the singulating member in such a manner that the dressing agent is applied to a seed after the seed has been singulated and prior to the seed being dispensed from the singulating member.

20 Claims, 2 Drawing Sheets

(58) Field of Classification Search
CPC ........... A01C 7/044; A01C 7/046; A01C 7/06;
A01C 7/10; A01C 7/105; A01C 14/00;
A01C 21/007
See application file for complete search history.

(56) References Cited

U.S. PATENT DOCUMENTS

| | | | |
|---|---|---|---|
| 2014/0033972 A1* | 2/2014 | Meyer ...................... | A01C 1/06 |
| | | | 118/303 |
| 2016/0073576 A1 | 3/2016 | Grimm et al. | |
| 2016/0374260 A1* | 12/2016 | Kowalchuk .............. | A01C 1/06 |
| | | | 111/170 |
| 2018/0192577 A1* | 7/2018 | Smith ...................... | A01C 7/20 |

FOREIGN PATENT DOCUMENTS

| | | |
|---|---|---|
| DE | 20 2012 101 029 U1 | 6/2013 |
| WO | WO 97/24918 A1 | 7/1997 |
| WO | WO 2008/155235 A1 | 12/2008 |

* cited by examiner

PRECISION SEEDER

BACKGROUND OF THE INVENTION

Field of the Invention

This invention relates to a single-grain seeder for introducing seeds into soil, including a singulating member which is suitable for singulating seeds supplied from a storage container and for dispensing the seeds individually. This invention also relates to a method for introducing seeds into soil using a single-grain seeder according to this invention.

Discussion of Related Art

Single-grain seeders are used in agriculture for introducing seed into the soil. They have small sowing coulters or plowshares which draw channels several centimeters deep in the arable soil. Seed grains which are stored in a storage container and are supplied to the singulating member are deposited individually in the channels or furrows. The furrows are subsequently closed again by a trailer filling-in system, for example by what is referred to as a harrow. The advantage of these agricultural machines for sowing plant seeds resides in the precise and uniform depth depositing of the seed, which, in comparison to broadcast sowing, in which the seed grains are distributed in broadcasted or random form over the entire arable area, leads to less eating by birds and to a more uniform emergence.

To assist the plant growth, the use of plant protection products in the form of chemical or biological substances is customary practice practices in agriculture. These are especially insecticides for protecting against sucking and eating insects and fungicides for protecting against fungal pathogens. The plant protection products are frequently applied over the field by spraying. However, only young plants which have already started to grow can thereby be reached, as a result of which certain plant diseases which already occur at the initial stage of growth or an insect pest which attacks the germinating seedlings cannot be efficiently treated. Another possibility of the application is the depositing of microgranules in the seed furrow. A precise punctiform placing of plant protection product is not possible here since the entire seed furrow including the spaces between the seed grains is always treated. This leads to an unnecessarily high consumption of protective agent.

To protect the seed and the seedling against fungi, bacteria and insects, it is customary for the seed to be treated centrally at the seed producers with what are referred to as dressing agents. In this case, the respective active substance or a combination of active substances in the form of a coating is applied directly to each individual seed grain. In addition to the actual active substances having a fungicidal and/or insecticidal effect, the dressing agent furthermore generally includes an adhesive for improving the adhesion of the active substances on the seed grain, and dispersants and dyes. Since the required plant protection product is supplied by the dressing to each seed grain or each plant in a correct dosage and in situ, a relatively small active substance quantity is sufficient in comparison to a spray application in order to effectively protect the seedling or the plants. This method is therefore also basically advantageous from an environmental aspect.

However, during the handling of seed coated in such a way by the farmer, an unavoidable partial abrasion of the applied plant protection product occurs during the sowing process because of mechanical loads in the seeder, as a result of which there is a fine dressing dust contaminated with active substances.

In particular in the case of pneumatically operating single-grain seeders which are customary nowadays and in which, for the controlled introducing of the seed into the soil, a singulating member can be subjected to a negative or positive pressure, said fine dressing dust is swirled up and distributed by the airflow of a blower. The fine dressing dust can accumulate in the process in the seeder, which can restrict the operating capability of the system and can cause a possible risk to the system operator. However, the more or less uncontrolled escape of the dressing dust from the seeder into the environment is particularly problematic and can constitute a risk to humans and animals, in particular to insects. For example, clothianidin is one of many active substances which are used in various plant protection products and in dressing agents and of which some, in particular if they pass into the environment in the form of the dressing dust, are suspected of possibly being toxic to pollinating insects which count toward an efficient insect.

The disadvantages in conjunction with the emission of dressing dust have already been made the subject of discussion in German Patent Reference DE 20 2012 101 029 U1 which proposes a seeder with a dust separator, by which air sucked up during the sowing process and containing dust particles can be split up into an air component and into a dust component, wherein the dust component which is separated from the air component can subsequently be introduced into the soil with the aid of special introducing means.

SUMMARY OF THE INVENTION

It is one object of this invention to provide a single-grain seeder, with the aid of which the arising of particle dust can already be prevented, but can at least be significantly reduced. Another object is to specify a method for introducing seeds into soil, by which the arising of particle dust is very substantially prevented.

This object and other objects are achieved by a single-grain seeder with the features described in this specification and in the claims.

A single-grain seeder according to this invention comprises an application unit for applying a dressing agent to a singulated seed, wherein the application unit is arranged with respect to the singulating member in such a manner that the dressing agent is applied to a seed after the seed has been singulated and prior to the seed being dispensed from the singulating member.

In other words, this invention makes a provision for the seeds which are to be singulated not to already be provided beforehand with dressing agent and then supplied from a storage container to the singulating member, but to be treated individually with a dressing agent only after singulating has taken place by the singulating member and before the seeds are then dispensed individually from the singulating member, for example directly into a seed furrow. For this purpose, the single-grain seeder according to this invention has an application unit for applying a dressing agent, which application unit is suitable for providing the seeds individually with a dressing agent. The application unit is arranged with respect to the singulating member in such a manner that the seeds have already been singulated by the singulating member before the application unit applies the dressing agent to each individual seed. The dressing agent is therefore applied after singulating has taken place and prior to the respective seed being dispensed from the singulating member. In the case of conventional seeders, in which seeds already provided with dressing agent beforehand are always exposed to a mechanical loading by rubbing against one another or against the walls of the seeder, a certain abrasion of the dry dressing agent coating in the form of very fine dust particles is unavoidable. This formation of dressing dust is very substantially to completely avoided by the single-grain seeder according to this invention.

According to a refinement of this invention, the single-grain seeder is a pneumatic single-grain seeder in which the singulating member is configured as a rotating perforated disk which can be subjected to a negative pressure or to a positive pressure. Perforated disks of this type, which are also referred to as sowing disks or seed disks, are provided with small holes or depressions on the outer edge, wherein, by selection of the hole size, the hole spacing and the rotational speed, optimum adaptation to different seed grain sizes and sowing conditions can be achieved and the sowing intensity, such as seeds per meter, to be varied.

For example, a negative pressure can be present on one side of the perforated disk, as a result of which seed grains on the other side of the perforated disk are picked up out of a storage container. The holes have to be dimensioned here in such a manner that the seed grains, for example maize grains, do indeed remain adhering to the holes, but cannot pass through the holes. A respective seed grain therefore adheres to the disk in the region of a hole by the negative pressure which is present. During rotation of the disk, each seed singulated in such a manner passes, according to this invention, through an application region in which the application unit is arranged and in which dressing agent is applied to the seed. The treated seed subsequently passes through a narrow circular segment in which the negative pressure present on the sowing disk abruptly breaks down. The seed grain treated with dressing agent then drops from the perforated disk and falls onto the soil or into a previously drawn furrow. In addition, a scraper can be provided on the perforated disk, by which the seed grain is reliably scraped off from the perforated disk. A singulated introduction or insertion of the dressed seed grains into the soil is thus very precisely possible, wherein the arising of dressing dust can be substantially completely prevented since the dressing takes place only at the sowing disk and directly before the seed is deposited in the soil. As a result, no mechanical stress whatsoever can act on the singulated and dressed seeds. The treated seed can be deposited in the soil typically within 5 to 20 ms, preferably within 10 ms after the application of the dressing agent. Within such a time interval, the application of the dressing agent has generally not yet completely dried, which is also beneficial to the dust-free depositing of the dressed grain.

In a further embodiment of this invention, the application unit comprises a nozzle for precise metering of the dressing agent which is then applied in liquid form or in the form of a gel. The nozzle is configured here in such a manner that it permits a substantially drop-shaped application of dressing agent to a respective seed per application process. A substantially drop-shaped application should be understood here as meaning an application of dressing agent which does not completely encase the seed but rather covers only a part of the seed surface. The dressing agent here is expediently configured so that it adheres as a drop to the seed without spray losses and dries without losing its adhesion.

A nozzle of this type can be configured, for example as a pneumatically driven valve. Use can thus be made of valves for contactless micrometering which are closed in the inoperative position and can be switched by an electro-pneumatic drive with opening times of less than 1 ms. Valves of this type generally have high metering frequencies and very high metering accuracy, as a result of which an extremely precise and reproducible metering operation is ensured.

According to a further refinement of this invention, the application unit comprises a sensor for sensing a singulated seed and/or the position thereof, wherein the application of the dressing agent to a seed can be triggered by a signal of the sensor. With such a sensor, it can be ensured that the nozzle only applies dressing agent when the sensor detects a singulated seed and gives a corresponding signal to the nozzle. It is thus also possible for different rotational speeds of a sowing disk to be reacted to in such a manner that, at a higher rotational speed, more seeds per unit of time are sensed by the sensor and, by a corresponding signal to the nozzle, a higher metering frequency of the nozzle is brought about. The sensor therefore ensures synchronization of the dressing agent application and for a precise punctiform application of the dressing agent to a seed.

According to this invention the dressing agent can be applied contactlessly, wherein the nozzle is preferably at a distance of 2 to 10 mm from the surface of the seed to be treated.

According to one refinement of this invention, dressing agent quantities of between 0.3 and 5 µl per seed to be treated can be metered with the nozzle. With such a quantity of dressing agent, a sufficient supply of the seed to be treated with active substances is generally ensured. Depending on the viscosity of the dressing agent used and on the surface structure of the seed to be treated, drop sizes of between approximately 0.3 and 5 mm can be produced on the seed.

The nozzle can preferably be configured as a high frequency nozzle with which metering frequencies within the range of 20 to 100 Hz can be realized, that is to say, the nozzle can undertake 20 to 100 applications per second. The actual metering frequency is directed towards the configuration and singulating speed of the singulating member. In the case of a rotating perforated disk, the metering frequency is directed toward the number of holes and toward the rotational speed of the perforated disk. As mentioned above, a sensor can sense the specific circumstances and, by a corresponding signal to the nozzle, can synchronize the metering frequency thereof.

According to this invention, it is possible for the dressing agent to be applied in a substantially punctiform manner to the seed. However, the dressing agent can also be applied in bead form or linearly.

The described single-grain seeders according to this invention have one advantage over conventional seeders that the arising and emission of a dressing dust polluting the environment can be completely or at least substantially prevented since the seed is only dressed at the seeder directly before the seed grains are dispensed from the machine.

A device for singulating seeds that has a singulating member and an application unit according to the preceding description can basically also be used in machines other than single-grain seeders and is hereby also disclosed independently of a single-grain seeder. In principle, a singulating device of this type is suitable for singulating any seeds which are intended to be provided with a dressing agent application directly before being output from the singulating device. In conjunction with this invention, a dressing agent is not only understood here within a narrower meaning of a plant protection product for treating seed, but also in the wider meaning of any desired agent which is suitable for treating seeds or granular materials and can be applied thereto by an application unit.

This invention also relates to a method for introducing seeds into soil using a single-grain seeder according to this invention, comprising the steps of: (a) supplying the seeds to be singulated from a storage container to the singulating member; (b) singulating the supplied seeds by the singulating member; (c) applying a dressing agent to a respectively singulated seed within the singulating member; (d) dispensing the singulated seed which is provided with the dressing agent from the singulating member; and (e) introducing the seed into the soil.

With a method configured in such a manner for introducing seeds into soil, the arising of a dressing dust polluting the environment can be completely or at least substantially prevented.

In one refinement of this invention, the method can be configured in such a manner that the time between method steps (c) and (d) is 5 to 20 ms, preferably 10 ms. In other words, a seed provided with dressing agent is dispensed from the singulating member directly after the application of a dressing agent, and therefore the time for a possible interaction between the dressed seed and the singulating member is kept extremely short. Abrasion of the dressing agent can thereby be substantially completely prevented. Depending on the dressing agent used, the time between method steps (c) and (d) can also be dimensioned so that the dressing agent has not yet completely dried when the treated seed is dispensed from the singulating member, and therefore formation of dust is furthermore suppressed and the seed can be deposited in a dust-free manner in the soil.

According to this invention, it can also be provided that the method provides cycles in which method step (c) is not carried out and a seed, after being singulated in step (b), is dispensed directly from the singulating member without being provided with a dressing agent. Such a method comprising different cycles can be of importance, for example, in conjunction with what is referred to as digital farming or precision farming. These are understood as meaning methods of locally differentiated management of usable agricultural areas, in which the differences of the soil and the productivity within a field are taken into consideration. Use is made for this purpose of digital maps and a position-determining system, as a rule GPS. If there are locally differentiated data with respect to soil composition and the occurrence of pests and/or weeds for a field which is to be seeded, the data can be taken into consideration during the discharging of seed with a seeder according to this invention or according to the method according to this invention. In this case, the dressing of the seed directly before the latter is dispensed from the singulating member permits dressing to meet requirements, such as seed grains can be dressed only for certain areas within a larger field while the seed outside the areas is discharged from the seeder without being dressed. The quantity of the respective application of dressing agent could basically also be selected in a locally differentiated manner and thus adapted to the circumstances. With a dressing of this type to meet requirements, the use of the dressing agent can be reduced since the dressing agent is specifically used only wherever it is actually needed. In addition, a possible pollution of the environment is likewise reduced by the reduced use of the dressing agent. It is also conceivable to equip a single-grain seeder according to this invention with a plurality of application units which are activatable independently of one another and each permit the application of different dressing agents individually or in combination. As a result, it is possible to react even more individually for special local soil conditions. For carrying out differentiated methods of this type, the GPS data of the discharging agricultural machine and the information from corresponding digital maps would have to be fed into the controller of each application device.

In summary, the proposed single-grain seeder and the proposed method for introducing seeds into soil using such a single-grain seeder permit a precise punctiform and simultaneously emission-free treatment and dispensing of the seed.

BRIEF DESCRIPTION OF THE DRAWINGS

This invention is explained in more detail in view of exemplary embodiments and with reference to the attached drawings, wherein.

DETAILED DESCRIPTION OF INVENTION

Figure 1:
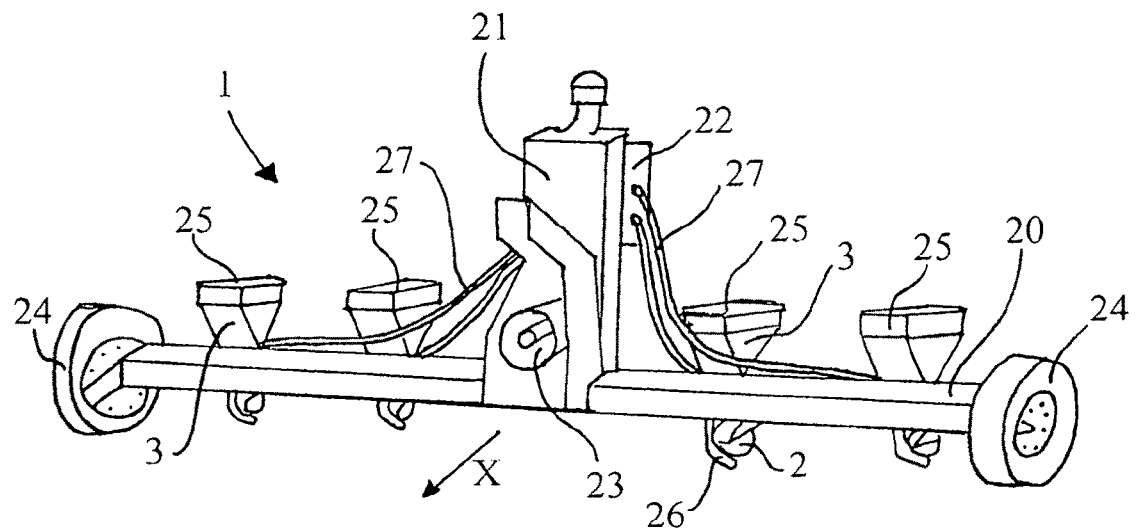
FIG. 1 shows a single-grain seeder according to this invention, in a perspective view.

FIG. 1 illustrates a single-grain seeder which is denoted overall by 1. Transversely with respect to a direction of travel X, the single grain seeder 1 has a carrier frame 20 which comprises a construction 21 for holding a blower 22. The single-grain seeder 1 is connectable via a connection 23 to an agricultural vehicle, for example a tractor. The carrier frame 20 has supporting wheels 24 at its two ends.

The single-grain seeder 1 is configured as a four-row seeder. Accordingly, FIG. 1 shows the four sowing units 25 which each have a storage container 3 for accommodating seed. In the lower region, each sowing unit 25 has a singulating member in the form of a rotating perforated disk 2 and a sowing coulter 26 which precedes the perforated disk 2 and draws a seed furrow in the soil. Compressed air lines 27 lead from the central blower 22 to the individual sowing units 25 and ensure the formation of a vacuum on one side of the perforated disk 2. FIG. 1 does not show a harrow which is arranged downsteam of the perforated disk 2 for closing the seed furrows, and a press-on roller 28 arranged downstream of the harrow. The application unit 30 which will be explained in more detail with reference to FIGS. 2 to 4 likewise cannot be seen in FIG. 1.

Figure 2:
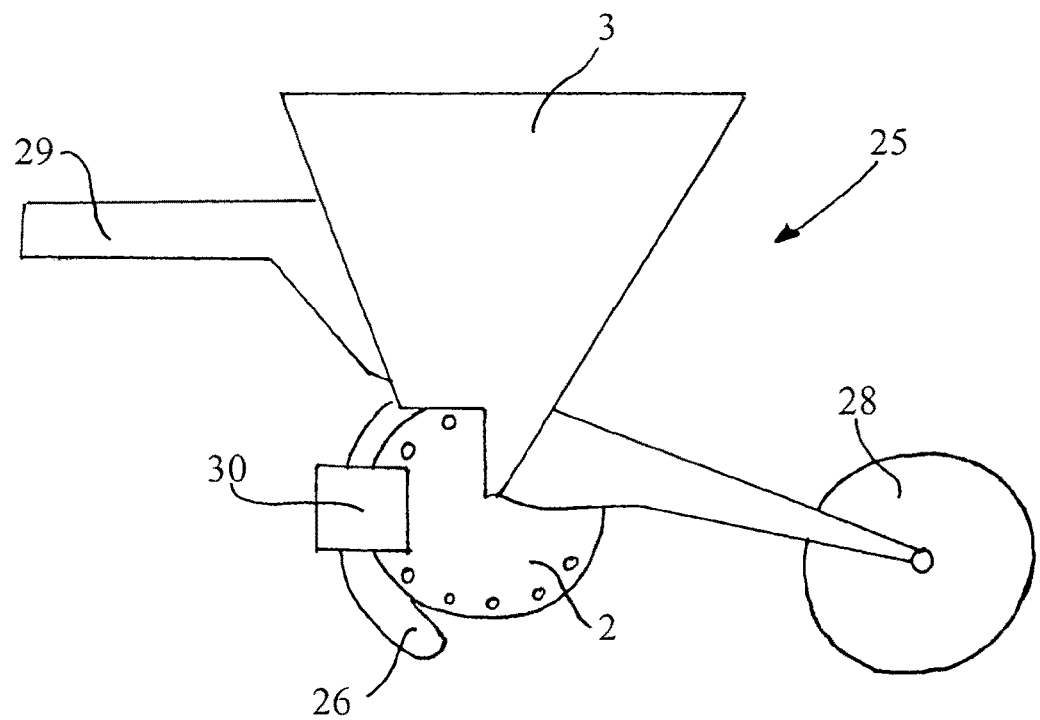
FIG. 2 shows a detail from FIG. 1 in a schematic side view.
Figure 3:
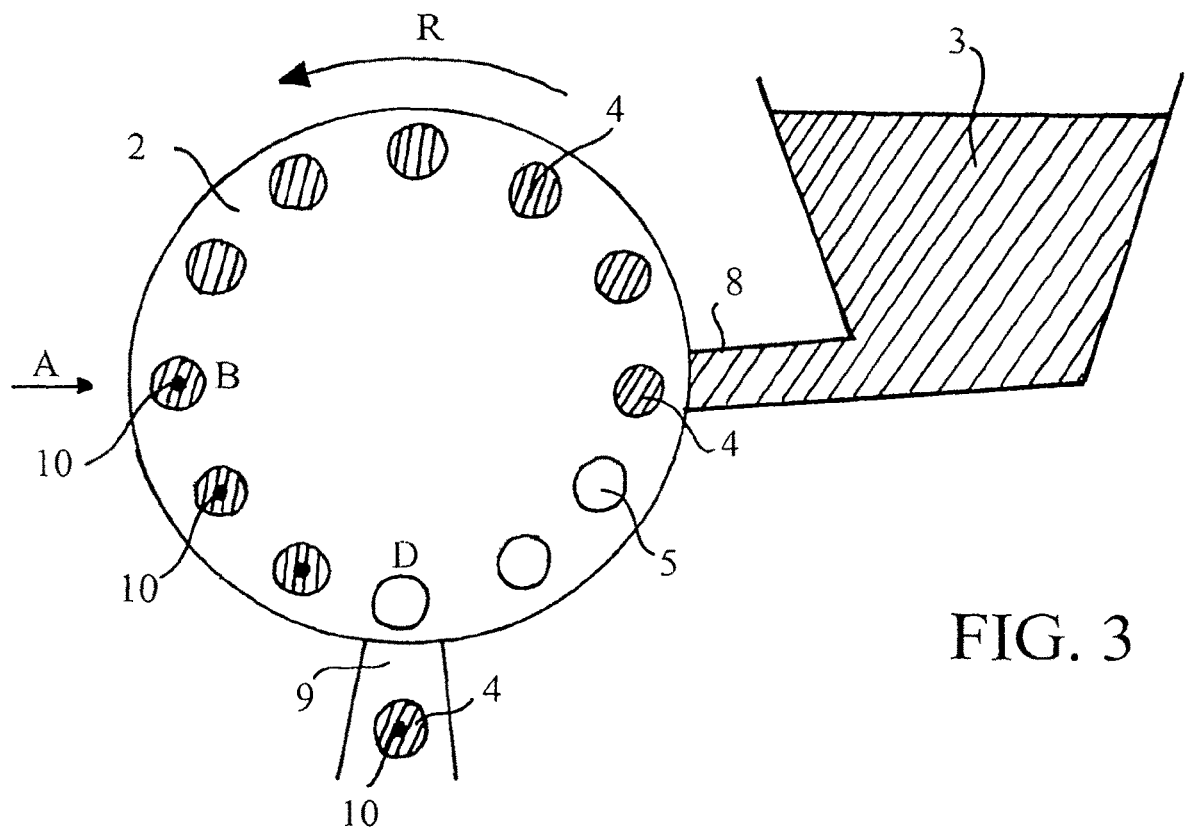
FIG. 3 shows a singulating member in the form of a rotating perforated disk as part of a single-grain seeder according to this invention.

FIG. 2 shows a sowing unit 25 from FIG. 1, in a more detailed side view. The sowing unit 25 is connectable to the carrier frame 20 of the single-grain seeder 1 via a connecting element 29. Seed which is stored in the storage container 3 passes into the region of the perforated disk 2 and, as will be further explained in conjunction with FIG. 3, is singulated there and subsequently provided with an application of dressing agent. The position of the application unit 30 for applying the dressing agent is indicated schematically in FIG. 2.

The mechanism for singulating the seed grains and for dressing the singulated seeds will now be explained in more detail with reference to FIGS. 3 and 4.

FIG. 3 shows a singulating member which is configured as a perforated disk 2 and to which seeds 4 are supplied from a storage container 3. The seeds 4 are seed grains, for example maize grains. The perforated disk 2 is provided on its outer edge with holes 5 which penetrate the perforated disk 2 and, as is apparent from FIG. 4, taper conically within the perforated disk 2 from a front side 6 toward a rear side 7. The diameter and the configuration of the holes 5 are dimensioned here in such a manner that seed grains 4 are received in the holes 5, but cannot pass therethrough.

On a side facing away from the observer in FIG. 3, the perforated disk 2 can be subjected to a negative pressure so that the seed grains 4 supplied from the storage container 3 are sucked onto the perforated disk 2 in the region of the holes 5 because of the present pressure drop. The perforated disk 2 rotates at a predetermined rotational speed in the direction of rotation indicated by the arrow R. Each hole 5 passing the storage container supply 8 can thereby pick up one seed grain 4 from the store. The perforated disk 2 thereby ensures that the seed grains 4 are singulated. On account of the negative pressure which is present, the seed grains 4 received in the holes 5 move together with the perforated disk 2 until they enter a region 9 which is in the shape of a circular segment and in which the negative pressure abruptly breaks down and the seed grain 4 drops from the perforated disk 2 in a position D. The seed grains can thereby be deposited in a defined and singulated manner, for example in a seed furrow on arable soil.

In a position B, a liquid or gel-like dressing agent is applied to the seed grains 4 by means of a high frequency nozzle, not illustrated in FIG. 3. The dressing agent which is applied in the form of a drop to the grains 4 and adheres thereto is referred to by 10.

Figure 4:
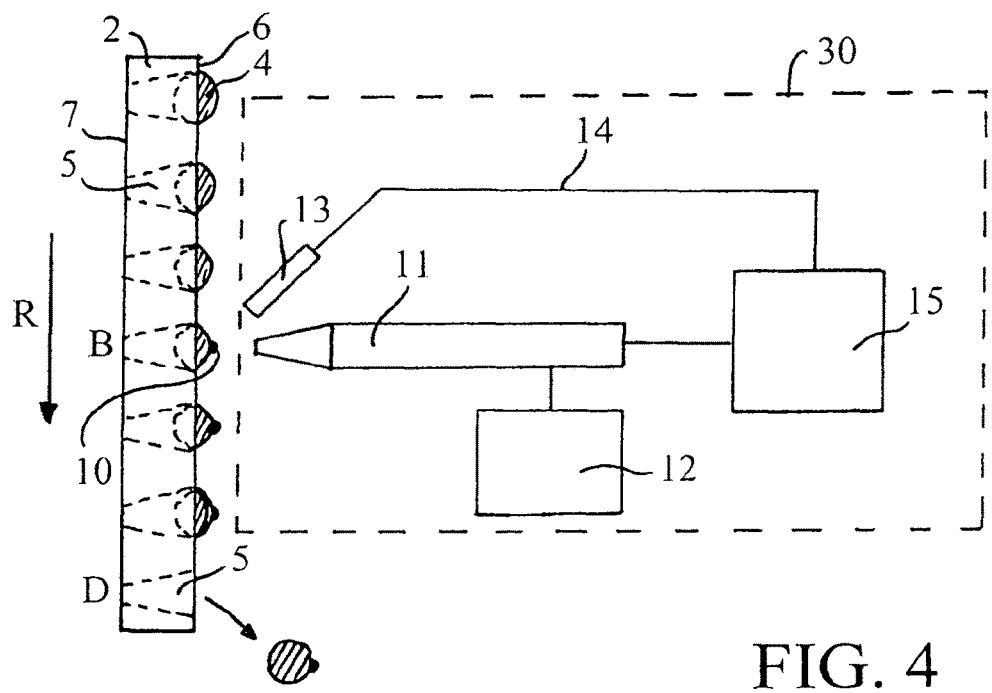
FIG. 4 shows the singulating member from FIG. 1 in a side view together with an application unit for applying a dressing agent.

The details in conjunction with the application of dressing agent are apparent from FIG. 4. The perforated disk 2 from FIG. 3 is illustrated here in a side view from the direction of the arrow A in FIG. 3. The conically tapering holes 5 passing through the perforated disk 2 are shown here by dashed lines. Seed grains 4 are fixed in the holes 5 on the perforated disk 2 by negative pressure present on the rear side 7 of the perforated disk 2 and move together with the latter. An application unit 30 which comprises a high frequency nozzle 11, a dressing agent store 12, a sensor 13 and a controller 15 is arranged adjacent to the perforated disk 2. During passage through a position B, a dressing agent 10 is applied to each seed 4 from the high frequency nozzle 11. For this purpose, the nozzle 11 is connected to the dressing agent store 12, wherein the dressing agent is, for example, an insecticide.

Furthermore, the nozzle 11 is assigned the sensor 13 which is intended for sensing a singulated seed 4 and the precise position thereof. The sensor 13 is connected to the controller 15 of the nozzle 11 via a connection 14 so that the nozzle 11 can be triggered by a signal of the sensor 13. In other words, the sensor 13 supplies a signal to the controller 15 as soon as the sensor detects a seed 4 in the position B, whereupon the controller 15 activates the nozzle 11 and applies the dressing agent 10 to the seed 4. It is thus ensured that the nozzle 11 only applies dressing agent 10 when the sensor 13 actually detects a singulated seed. In particular, it can thus be possible to react to different rotational speeds of the perforated disk 2 in such a manner that, at a higher rotational speed, more grains 4 per unit of time are sensed by the sensor 13 and, by a corresponding signal to the nozzle 11, a higher metering frequency of the nozzle 11 can be brought about.

The nozzle 11 is positioned spaced apart approximately 5 mm from the surface of the seed 4 and operates contactlessly. It applies approximately 0.5 µl of dressing agent 10 to a seed 4 per application process, as a result of which a substantially punctiform application of dressing agent with a diameter of less than 2 mm is achieved. The frequency of the nozzle 11 can be set, for example, in such a manner that it undertakes an application every 33 ms.

The seeds 4 provided in such a manner with dressing agent 10 revolve further with the perforated disk 4 until they enter a region 9 which has already been explained above in conjunction with FIG. 3 and in which the negative pressure abruptly breaks down and the seeds 4 drop from the perforated disk 2, as can be seen in the lower region of the perforated disk 2 illustrated in FIG. 4, at position D. The seed grain 4 is dispensed from the singulating member at the position D within 10 ms after the application of dressing agent in position B. This has the result that the dressing agent 10 on the seed 4 has not yet completely dried, as a result of which completely dust-free depositing of the dressed seed 4 in the soil is possible.

The seeds 4 are therefore first of all singulated before they are individually provided with an application of dressing agent and are shortly afterwards dispensed from the singulating member and deposited in the soil. In a single-grain seeder of this type, the seeds 4 which are provided with dressing agent are not exposed to any mechanical stress whatsoever, as a result of which the arising of dressing dust can be efficiently avoided.

In the exemplary embodiment illustrated in FIG. 4, the nozzle 11 is arranged in such a manner that the dressing agent is applied centrally to a seed 4 essentially in the horizontal direction. In other embodiments, the nozzle can also be arranged in such a manner that dressing agent is applied at a certain angle with respect to the horizontal.

The invention claimed is:

1. A single-grain seeder for introducing seeds (4) into soil, comprising:
   a singulating member (2) suitable for singulating seeds (4) supplied from a storage container (3) and for dispensing the seeds individually, wherein the singulating member (2) is configured as a rotating perforated disk which is subjected to a negative pressure or to a positive pressure; and
   an application unit (30) configured to apply a punctiform application of a dressing agent (10) having a diameter of less than 2 mm on a seed surface of a singulated seed (4), wherein the application unit (30) is arranged with respect to the rotating perforated disk of the singulating member (2) in such a manner that the dressing agent (10) is applied to a seed (4) after the seed (4) is singulated and prior to the seed (4) being dispensed from the rotating perforated disk of the singulating member (2);
   wherein the rotating perforated disk comprises an axis of rotation, a front side face perpendicular to the axis of rotation, and a plurality of holes in the front side face, each of the plurality of holes configured to receive in a singulated position on the front side face one of the singulated seeds and to move the one of the singulated seeds to a coating position (B), and the application unit comprises a nozzle aligned in the coating position (B) facing the front side face to apply the punctiform application of the dressing agent to the one of the singulated seeds while fixed in the singulated position by the negative pressure or the positive pressure.

2. The single-grain seeder as claimed in claim 1, wherein the application unit (30) comprises a nozzle (11) for metering the dressing agent (10) in the punctiform application to only a side of the singulated seed (4) facing the nozzle (11), wherein the dressing agent (10) is configured to adhere as a liquid or gel drop to the seed without spray loss and dry without losing adhesion.

3. The single-grain seeder as claimed in claim 2, wherein the nozzle (11) is configured as a pneumatically driven micrometering valve that is closed in the inoperative position and is opened by an electro-pneumatic drive with opening times of less than 1 ms.

4. The single-grain seeder as claimed in claim 3, wherein the application unit (30) comprises a sensor (13) sensing a singulated seed (4) and/or a position thereof, and application of the dressing agent (10) to a seed (4) can be triggered by a signal of the sensor (13).

5. The single-grain seeder as claimed in claim 4, wherein the dressing agent (10) is applied contactlessly, and the nozzle (11) is at a distance of 2-10 mm from a surface of the seed (4) to be treated.

6. The single-grain seeder as claimed in claim 5, wherein the dressing agent quantities of between 0.3 and 5 µl per seed (4) to be treated can be metered with the nozzle (11).

7. The single-grain seeder as claimed in claim 6, wherein the nozzle (11) has a metering frequency of 20 to 100 Hz.

8. The single-grain seeder as claimed in claim 7, wherein the dressing agent (10) is applied in a substantially punctiform manner to the seed (4).

9. A method for introducing the seeds (4) into soil using a single-grain seeder as claimed in claim 8, comprising the following steps:
   a) supplying the seeds (4) to be singulated from a storage container (3) to the singulating member (2);
   b) singulating the supplied seeds (4) by the singulating member (2);
   c) applying the dressing agent (10) to a respectively singulated seed (4) within the singulating member (2);
   d) dispensing the singulated seed (4) which is provided with the dressing agent (10) from the singulating member (2); and
   e) introducing the seed (4) into the soil.

10. The method as claimed in claim 9, wherein the method comprises repeating steps a) and b) in cycles in which method step c) is not carried out and the seed (4), after being singulated in step b), is dispensed directly from the singulating member (2) without being provided with a dressing agent (10).

11. The method as claimed in claim 9, wherein the method comprises repeating steps a) and b) in cycles in which method step c) is not carried out and the seed (4), after being singulated in step b), is dispensed directly from the singulating member (2) without being provided with a dressing agent (10).

12. The single-grain seeder as claimed in claim 2, wherein the application unit (30) comprises a sensor (13) sensing a singulated seed (4) and/or a position thereof, and application of the dressing agent (10) to a seed (4) can be triggered by a signal of the sensor (13).

13. The single-grain seeder as claimed in claim 2, wherein the dressing agent (10) is applied contactlessly, and the nozzle (11) is at a distance of 2-10 mm from a surface of the seed (4) to be treated.

14. The single-grain seeder as claimed in claim 2, wherein the dressing agent quantities of between 0.3 and 5 µl per seed (4) to be treated can be metered with the nozzle (11).

15. The single-grain seeder as claimed in claim 2, wherein the nozzle (11) has a metering frequency of 20 to 100 Hz.

16. The single-grain seeder as claimed in claim 1, wherein the application unit (30) comprises a nozzle (11) for metering the dressing agent (10).

17. The single-grain seeder as claimed in claim 1, wherein the rotating perforated disk comprises a rear side face perpendicular to the axis of rotation and parallel to the front side face, and each of the plurality of holes extends in a direction parallel to the axis of rotation through the rotating perforated disk from the front side face to the rear face, and the negative pressure is applied to the holes from the rear side face.

18. The single-grain seeder as claimed in claim 17, wherein each of the plurality of holes tapers conically within the perforated disk from the front side face to the rear face.

19. The single-grain seeder as claimed in claim 1, wherein the punctiform application of the dressing agent (10) comprises a drop-shaped liquid or gel application of the dressing unit having the diameter of less than 2 mm and covering only a part of the seed surface of the singulated seed which is facing the nozzle while fixed in the singulated position.

20. The single-grain seeder as claimed in claim 1 wherein the dressing agent (10) is applied as a drop in a form of a gel.

* * * * *